(12) United States Patent
Yokomoto et al.

(10) Patent No.: US 8,622,296 B2
(45) Date of Patent: Jan. 7, 2014

(54) MAGNETIC STRIPE CARD READER ASSEMBLY AND METHOD

(75) Inventors: Randy Yokomoto, Torrance, CA (US); Ian Kidman, Newbury Park, CA (US); Nhut Trung Ha, Burbank, CA (US); Joseph Butryn, Redondo Beach, CA (US)

(73) Assignee: Citigroup Technology, Inc., New York, NY (US)

(*) Notice: Subject to any disclaimer, the term of this patent is extended or adjusted under 35 U.S.C. 154(b) by 0 days.

(21) Appl. No.: 13/470,967

(22) Filed: May 14, 2012

(65) Prior Publication Data

US 2013/0299585 A1  Nov. 14, 2013

(51) Int. Cl.
| | |
|---|---|
| G06K 7/08 | (2006.01) |
| G07F 19/00 | (2006.01) |
| G06K 5/00 | (2006.01) |
| G06K 7/00 | (2006.01) |
| G06K 13/00 | (2006.01) |
| G06K 19/06 | (2006.01) |

(52) U.S. Cl.
USPC ........... 235/449; 235/379; 235/380; 235/382; 235/435; 235/439; 235/475; 235/482; 235/493

(58) Field of Classification Search
USPC .............. 235/382, 382.5, 435, 442, 449, 482, 235/483, 379, 380, 439, 475, 493
See application file for complete search history.

(56) References Cited

U.S. PATENT DOCUMENTS

| | | | |
|---|---|---|---|
| 3,758,754 A | 9/1973 | Jensen | |
| 4,585,929 A * | 4/1986 | Brown et al. | 235/449 |
| 4,672,661 A | 6/1987 | Clark, Jr. | |
| 5,979,754 A * | 11/1999 | Martin et al. | 235/382 |
| 7,401,736 B2 | 7/2008 | May | |
| 8,083,138 B2 | 12/2011 | Henry | |
| 2006/0043180 A1* | 3/2006 | Ison et al. | 235/442 |

(Continued)

FOREIGN PATENT DOCUMENTS

| | | | | |
|---|---|---|---|---|
| GB | 2398911 A | 9/2004 | | |
| JP | 1007185 A | 1/1989 | | |
| JP | 2018690 A | 1/1990 | | |
| JP | 09035017 A * | 2/1997 | ............. | G06K 17/00 |

OTHER PUBLICATIONS

International Search Report and Written Opinion dated Jul. 11, 2013 for PCT/US2013/39859, pp. 1-10.

*Primary Examiner* — Steven S Paik
*Assistant Examiner* — Claude J Brown
(74) *Attorney, Agent, or Firm* — John M. Harrington, Esq.; Johnson, Marcou & Isaacs, LLC

(57) ABSTRACT

A magnetic stripe card reader assembly and method includes a panel having portions defining a card entry opening of a card entry path provided for receiving a magnetic stripe card with the magnetic stripe disposed perpendicular to the card entry path. A card swipe path in communication with the card entry path is provided for swiping the card with the magnetic stripe disposed parallel to the card swipe path, and a magnetic stripe read head is disposed proximate the card swipe path for reading only a pre-determined segment of the magnetic stripe. The panel is also provided with portions defining a card withdrawal opening of a card withdrawal path in communication with the card swipe path and partly overlapping the card entry opening for withdrawal of the card with the magnetic stripe disposed perpendicular to the card withdrawal path.

15 Claims, 6 Drawing Sheets

(56) References Cited

U.S. PATENT DOCUMENTS

| | | | |
|---|---|---|---|
| 2007/0228178 A1* | 10/2007 | Rakoff et al. | 235/482 |
| 2009/0187507 A1* | 7/2009 | Brown | 705/66 |
| 2009/0302113 A1* | 12/2009 | Li et al. | 235/454 |
| 2011/0179485 A1 | 7/2011 | Le | |
| 2011/0238581 A1* | 9/2011 | Severson et al. | 705/67 |

* cited by examiner

MAGNETIC STRIPE CARD READER ASSEMBLY AND METHOD

FIELD OF THE INVENTION

The present invention relates generally to the field of magnetic stripe cards and more particularly to a magnetic stripe card reader assembly and method for unlocking an electric lock, such as an electric door lock.

BACKGROUND OF THE INVENTION

A magnetic stripe card is a type of card capable of storing data on the magnetic stripe on the card. The magnetic stripe may contain multiple tracks on which data may be recorded. International standards prescribe, for example, the size of the card, the location of the magnetic stripe and the formats of data recorded on the magnetic stripe. For example, international standards for bankcards including, without limitation, ATM cards, credit cards, and debit cards may prescribe a card size of 3.375 inches long by 2.125 inches wide.

Such standards may also prescribe, for example, the location and width of an elongate magnetic stripe extending across the back of the card on which may be encoded a Bank Identification Number (BIN) or Issuer Identification Number (IIN) in data recorded, for example, on a left-hand portion of the magnetic stripe running to a point near the middle of the magnetic stripe and a cardholder's account information on a right-hand portion of the magnetic stripe.

The magnetic stripe may be read by a magnetic read head of a card reader, for example, of an automated teller machine (ATM) to enable the cardholder to perform an ATM transaction. The card reader captures the cardholder's account information and the BIN or IIN recorded on the magnetic stripe, which may be sent to a host processor coupled to the ATM. The host processor may use such information to route the transaction to the cardholder's bank. An ATM keypad may let the cardholder enter a personal identification number (PIN) and information about the transaction which the cardholder wishes to perform.

In addition, magnetic stripe card readers may be deployed to control access to areas, such as ATM lobbies or vestibules, that are provided with doors secured by electric locks. Such electric door locks may be unlocked, for example, by swiping a properly encoded magnetic stripe card at the card reader. Such deployment may be referred to as an "access control card reader" ("ACCR"). If the proper credentials are encoded on the magnetic stripe, a controller to which the card reader of the ACCR is coupled may send a signal to the electric door lock to unlock the door and admit the cardholder. Thus, cardholders may gain access to such locked ATM lobbies or vestibules by swiping their properly encoded bankcards through a card reader of the ACCR. Typically, the bankcard used for such access may be any valid bankcard such as an ATM card, a credit card, or a debit card issued by a financial institution.

In recent years, huge economic losses have been incurred as a result of the theft and fraudulent use by criminals of cardholders' credentials recorded on the magnetic stripe of their bankcards. One way in which such theft occurs is a criminal practice referred to as "skimming" of bankcard information when a bankcard is used in an otherwise legitimate transaction.

A growing problem of skimming involves criminals putting a device with a skimming read head, such as an overlay, over a card slot of an ATM or ACCR which reads the magnetic stripe as the cardholder unknowingly passes his or her bankcard through the card slot to be read by the internal read head of the ATM or ACCR. The skimming read head reads the same bankcard information that is read by the ATM or ACCR read head and records or sends the information to the criminals.

In another technique, criminal skimmers may access the internal read head of the ATM or ACCR and attach a recording device that can record data from the magnetic stripe card. Regardless of the skimming technique used, it is important to criminal skimmers to make sure that the device at which their skimming activity occurs, such as an ATM or ACCR, continues to work so that cardholders are unaware that their bankcards are being illegally recorded.

In the past, various anti-skimming solutions have been deployed on ATMs across the U.S. Some such solutions have done an effective job of preventing skimming at ATMs for at least a while. However, as may be expected, criminals have found their way to skimming at unprotected ACCRs over time. Consequently, skimmers have defrauded, and are continuing to defraud, financial institutions out of many millions of dollars.

There is a present need for magnetic stripe card readers and methods that avoid exposing a cardholder's account information to potential theft by skimmers when the cardholder uses his or her magnetic stripe card at an ACCR to access a locked premises, such as an ATM vestibule or lobby.

SUMMARY OF THE INVENTION

Embodiments of the invention provide a magnetic stripe card reader assembly and method consisting, for example, of a panel having portions defining a card entry opening of a card entry path for receiving a magnetic stripe card with the magnetic stripe disposed perpendicular to the card entry path. A card swipe path in communication with the card entry path is provided for swiping the card with the magnetic stripe disposed parallel to the card swipe path. In addition, a magnetic stripe read head is disposed proximate the card swipe path for reading only a pre-determined segment of the magnetic stripe. Further, the panel also has portions defining a card withdrawal opening of a card withdrawal path in communication with the card swipe path and partly overlapping the card entry opening for withdrawal of the card with the magnetic stripe disposed perpendicular to the card withdrawal path.

In aspects of embodiments of the invention, the card entry path may include, for example, a card entry guide for guiding a first edge of the card along the card entry path. The card entry path may also include, for example, a back stop defining a terminus of the card entry path. In addition, the back stop may define a guide for guiding a second edge of the card along the card swipe path. Further, the card swipe path may include, for example, a bottom stop defining a terminus of the card swipe path. Still further, the bottom stop may define, for example, a guide for guiding a third edge of the card along the card withdrawal path.

In further aspects of embodiments of the invention, the magnetic stripe read head may be spaced from the terminus of the card swipe path by a distance that is less than a length of the magnetic stripe. The magnetic stripe read head may also be spaced from the terminus of the card swipe path by a distance that at least as great as a length of the pre-determined segment of the magnetic stripe. In another aspect, the magnetic stripe read head may be disposed proximate the card swipe path for reading only the pre-determined segment of the magnetic stripe on which is encoded data for unlocking an electric lock, such as issuer identification data or bank identification data for unlocking the electric lock. In either aspect, the magnetic stripe read head may be disposed proximate the card swipe path for reading only the pre-determined segment of the magnetic stripe.

The method for reading a magnetic stripe card may involve, for example, providing a panel having portions defining a card entry opening into a card entry path for receiving a magnetic stripe card with the magnetic stripe disposed perpendicular to the card entry path, and providing a card swipe path in communication with the card entry opening for swiping the card with the magnetic stripe disposed parallel to the card swipe path. A magnetic stripe read head may be located proximate the card swipe path for reading only a pre-determined segment of the magnetic stripe on which is encoded data, other than account data, for unlocking an electric lock. Providing the panel may further involve, for example providing the panel with portions defining a card withdrawal opening of a card withdrawal path in communication with the card swipe path and partly overlapping the card entry opening for withdrawal of the card with the magnetic stripe disposed perpendicular to the card withdrawal path.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1:
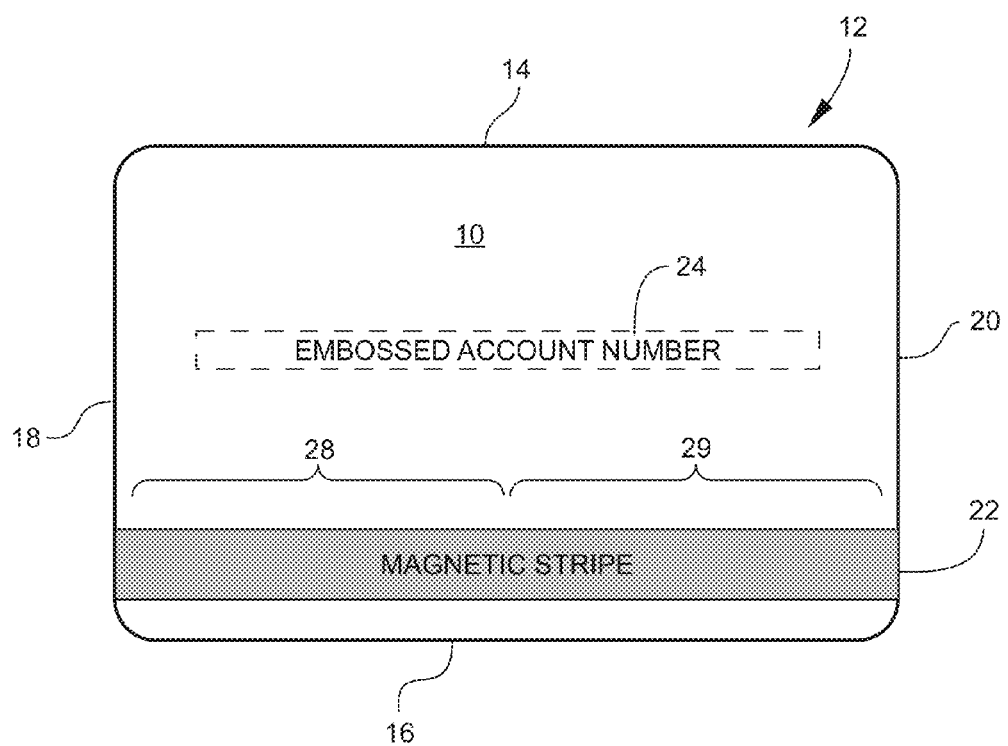
FIG. 1 is an elevational view of an example of the back side of a typical magnetic stripe bankcard.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide a card reader assembly and method that reads, for example, only a limited portion of the magnetic stripe of a bankcard on which the BIN or IIN is recorded. In addition, the card reader assembly for embodiments of the invention is configured to receive a bankcard in the card opening with its long edge first and the magnetic stripe of the bankcard perpendicular to the path of the bankcard as it is received so that it is impossible for an external skimming read head to read the magnetic stripe of the bankcard.

An ATM ACCR system may send the BIN or IIN encoded, for example, in eight digits recorded on the left-hand portion of the magnetic stripe on the back of the bankcard up to a host server for verification before unlocking a door and allowing the cardholder access to the enclosed ATM vestibule or lobby. Upon verifying the validity of the bankcard based on the BIN or IIN, the host server may send a message back to the ACCR mechanism to de-energize a magnetic lock holding the door closed and to allow the door to open so the cardholder may enter the ATM vestibule. Thus, it is only necessary for the ACCR read head to read and send the eight digits recorded on the left-hand portion of the magnetic stripe on the back of the bankcard to the host server for verification in order to open the ATM vestibule or lobby door.

Criminal skimmers typically need all of the data recorded on the magnetic stripe, including both the cardholder's account information and the BIN or IIN, in order to create fake bankcards. In order to address such criminal skimming attacks on ACCRs, embodiments of the invention provide a magnetic stripe card reader assembly that reads only enough information to allow the ACCR to release the door and does not read, for example, a cardholder's account information. Thus, the card swipe reader assembly for embodiments of the invention reads, for example, only the eight digits comprising the BIN or IIN recorded on the left-hand portion of the magnetic stripe on the back of the bankcard and supplies that data to the host server, which in turn opens the financial center ATM vestibule or lobby door.

It is to be noted that even if the card reader for embodiments of the invention is configured to read, for example, only the eight digits recorded on the left-hand portion of the magnetic stripe, if the bankcard is inserted into the card opening in the traditional way with the short edge first, criminal skimmers may still apply an exterior skimming head on the front of the existing card opening. Consequently, because the bankcard goes into the card opening with its short edge first, the full length of the magnetic stripe of the bankcard may be exposed to an external skimmer applied on the exterior of the card opening.

To address this issue, another feature of the card reader assembly for embodiments of the invention incorporates a configuration which eliminates insertion of the bankcard with its short edge first. In such feature, the bankcard is received in the card opening long edge first so that the magnetic stripe enters into the card opening in a path that is perpendicular to the magnetic stripe itself. Thus, instead of exposing the length of the magnetic stripe of the bankcard to an external skimmer read head, the magnetic stripe of the bankcard simply crosses the skimmer read head at right angles. In that way, it is impossible for a skimmer read head attached to the outside of the card opening to read the magnetic stripe.

FIG. 1 is an elevational view of an example of the back side of a typical magnetic stripe bankcard 12. Referring to FIG. 1, the back side 10 of the bankcard 12 has a pair of opposing long edges 14, 16 and a pair of opposing short edges 18, 20. The magnetic stripe 22 of the bankcard 12 extends across the card between and perpendicular to the short edges 18, 20 of the bankcard 12 and parallel to the long edges 14, 16 of the bankcard 12. It is to be noted that the magnetic stripe may have multiple tracks on which data may be recorded and that data may be recorded on any one or more of such tracks or all of such tracks. However, for the sake of simplicity and without limitation, the discussion herein assumes that the cardholder's account data and the BIN or IIN data are recorded on only one of such tracks, such as track 2 of the magnetic stripe 22.

Account information may also be embossed in areas, such as area 24, on the front side of the bankcard 12, and other information may be printed in various areas on the either side of the bankcard. Typically, the BIN or IIN information may be encoded in data recorded, for example, on a pre-defined portion 28 of the magnetic stripe card 22 beginning at or near the left-hand short edge 18. It is to be understood that the location of the magnetic stripe 22 and the location of the portion 28 of the magnetic stripe 22 on which the BIN or IIN information is encoded may be pre-defined by international standards.

Referring further to FIG. 1, the BIN or IIN data may be encoded on a portion 28 of the magnetic stripe 22 that extends from the left-hand short edge 18 of the bankcard in the direction of the right-hand short edge 22 of the bankcard 12. As previously noted, it is necessary for the read head of an ACCR to read only the particular portion 28 of the magnetic stripe 22 on which the BIN or IIN information is recorded to obtain all of the information that is needed to de-energize the magnetic door lock and allow a cardholder into a locked branch or ATM vestibule or lobby.

Consequently, the BIN or IIN data on the magnetic stripe 22 that must be read by the internal read head of an ACCR to admit a cardholder into a locked the branch or ATM vestibule or lobby is not sufficient for a criminal to make a fraudulent card. Customer-specific information, such as the cardholder's account information and expiration date, may recorded on the remaining portion 29 of the magnetic stripe 22 which is not required to be read by the internal read head of the ACCR to admit a cardholder into the branch or ATM vestibule or lobby. As noted above, the BIN or IIN is the banking identification number or issuer identification number, which only identifies a financial institution.

Figure 2:
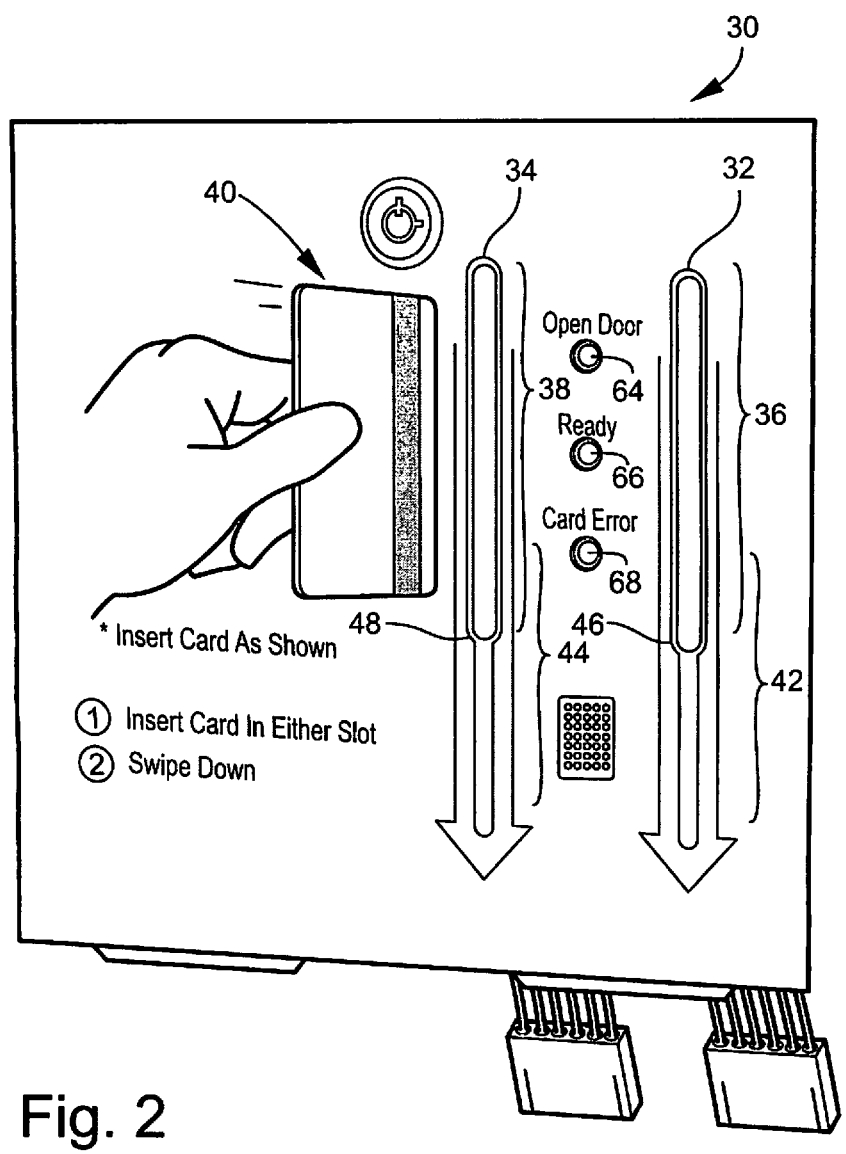
FIG. 2 is an elevational view of an example of a front panel of the card reader assembly for embodiments of the invention.

FIG. 2 is an elevational view of an example of a front panel 30 of the card reader assembly for embodiments of the invention. Referring to FIG. 2, the front panel 30 of the card reader assembly may be provided with two card openings 32, 34 positioned, for example, in side-by-side relationship. It is to be understood that two card openings 32, 34 are provided as a matter of reliability so that failure of one card reader will not prevent access and that embodiments of the invention may include only one card opening or any other number of card openings on the front panel 30. It is also to be noted that the card openings 32, 34 depicted in FIG. 2 are arranged vertically on the front panel 30 of the card reader assembly. It is likewise to be understood that such vertical arrangement is a matter of ergonomics and that embodiments of the invention may include card openings in a horizontal arrangement or in any other arrangement on the front panel 30.

Referring further to FIG. 2, a first portion of each card opening may function as a card entry opening 36, 38 which may have an accompanying graphic 40 that illustrates a proper way to insert a bankcard. A second portion of each card opening may function as a card withdrawal opening 42, 44. The edges of the card entry openings 36, 38 may be beveled or chamfered as shown in FIG. 2 to facilitate card entry. In addition, the card entry openings 36, 38 may be illuminated, for example, by LEDs (not shown), such as blue LEDs, positioned behind the front panel 30. Such illumination may enable a cardholder to more easily see the card entry openings 36, 38, at night and may be bright enough to draw a cardholder's attention to the card entry openings 36, 38 whether it is daytime or nighttime.

Further, a swing-away cam or gate (not shown) may be positioned at a lower end 46, 48 of each card entry opening 36, 38 to prevent insertion by a cardholder of a bankcard into any portion of the card openings 32, 34 other than the card entry opening 36, 38. Once a card is received in one of the card entry openings 36, 38, the swing-away cam or gate may be pushed out of the way by the card as the card is swiped downward along a card swipe path toward a corresponding one of the card withdrawal openings 42, 44. The swing-away cam or gate may serve multiple purposes, one of which is to direct a cardholder to insert the cardholder's card into one of the card entry openings 36 or 38, and another of which is to protect the internal magnetic read head of the card reader assembly which may be damaged by a card that is inserted incorrectly into one of the card withdrawal openings 42, 44.

Thus, it can be seen that embodiments of the invention may provide several ways of assuring that a cardholder inserts the cardholder's bankcard properly. A first such way is the graphic 40 proximate the card entry openings 36, 38; a second such way includes the beveled edges of the card entry openings 36, 38; a third way includes the LEDs disposed behind the card entry openings 36, 38, and a fourth way is the swing-away cam or gate at the bottom ends 46, 48 of the card entry openings 36, 38.

Figure 3:
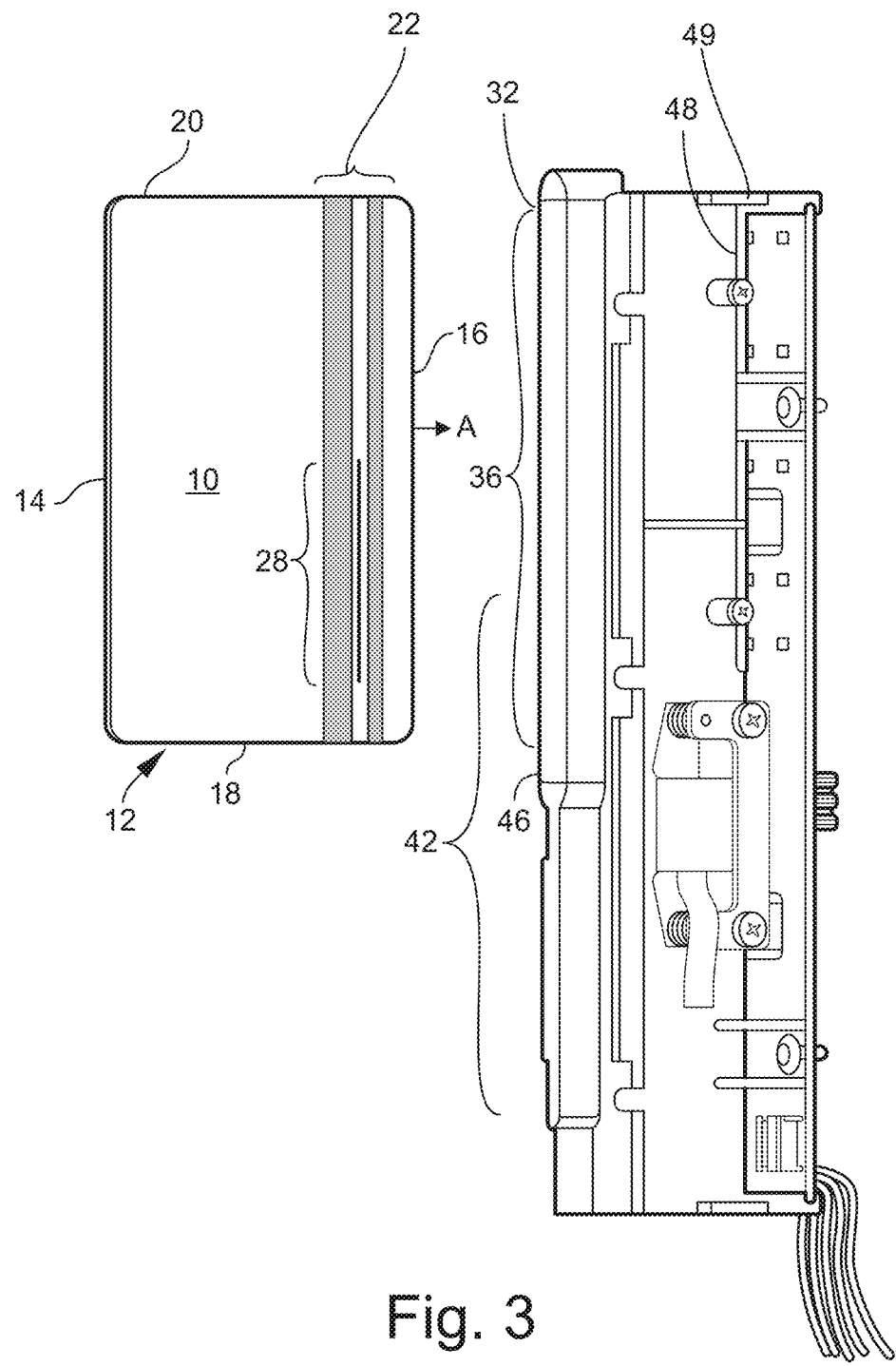
FIG. 3 is side elevational view of an example of the arrangement of components associated with one of the card openings of the card reader assembly for embodiments of the invention.

FIG. 3 is side elevational view of an example of the arrangement of components associated with one of the card openings 32 of the card reader assembly for embodiments of the invention. Referring to FIG. 3, a bankcard 12 may be received in the card entry opening 36 of the card opening 32 in arrow direction "A" with one of the long edges 16 of the bankcard 12 entering the card entry opening 36 first. Referring further to FIG. 3, a card entry guide 49 may guide a short edge 20 of the card 12 forward along a card entry path in arrow direction "A" with the magnetic stripe 22 of the card disposed perpendicular to the card entry path. Referring further to FIG. 3, a back stop 48 may limit the extent to which the bankcard 12 can be inserted into the card entry opening 36. Thus, a cardholder may insert the bankcard 12 into the card entry opening 36 with the long edge 16 first until the long edge 16 meets the back stop 48.

Figure 4:
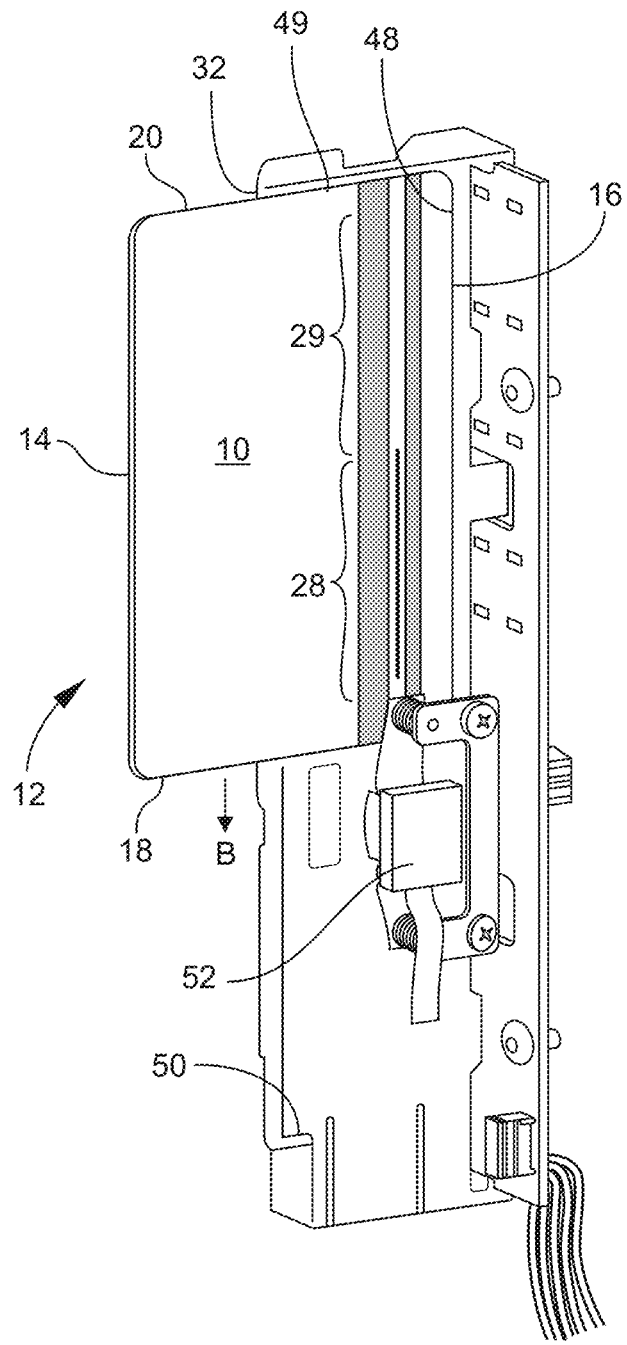
FIG. 4 is a side perspective view of the example of the arrangement of components shown in FIG. 3 with the bankcard inserted and before the bankcard is swiped.
Figure 5:
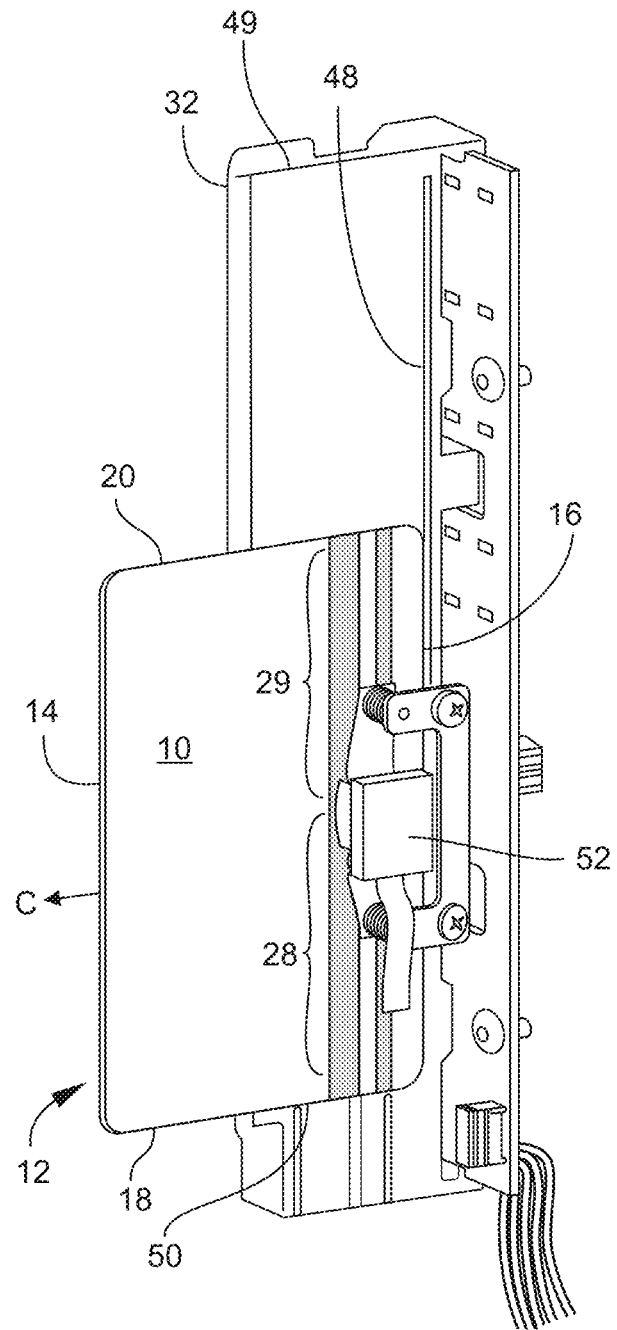
FIG. 5 is another side perspective view of the example of the arrangement of components shown in FIGS. 3 and 4 after the bankcard is swiped and before the bankcard is withdrawn.

FIG. 4 is a side perspective view of the example of the arrangement of components shown in FIG. 3 with the bankcard 12 inserted and before the bankcard 12 is swiped. FIG. 5 is another side perspective view of the example of the arrangement of components shown in FIGS. 3 and 4 after the bankcard 12 is swiped and before the bankcard 12 is withdrawn. Referring to FIG. 4, once the long edge 16 of the bankcard 12 reaches the back stop 48, the back stop 48 serves as a guide along which the long edge 16 of the bankcard 12 is swiped along a card swipe path in arrow direction "B" by the cardholder until another short edge 18 of the bankcard 12 reaches a bottom stop 50 of the card reader assembly as shown in FIG. 5.

Referring again to FIG. 4, as the bankcard 12 is swiped in arrow direction "B" by the cardholder, the segment 28 of the magnetic stripe 22 on which the BIN or IIN is recorded passes by and is read by a read head 52 located inside the card opening 32 before the short edge 18 of the bankcard 12 reaches the bottom stop 50. When the short edge 18 of the bankcard 12 reaches the bottom stop 50, the card 12 cannot be swiped any further in the direction "B". Thus, the part of the magnetic stripe 22 on which customer account information is recorded 29 cannot pass by and be read by the read head 52.

Referring to FIG. 5, upon reaching the bottom stop 50, the bottom stop 50 defines a guide for guiding the short edge 18 as the card 12 is withdrawn along a card withdrawal path in arrow direction "C" from the card withdrawal opening 42 as shown in FIGS. 2 and 3.

Figure 6:
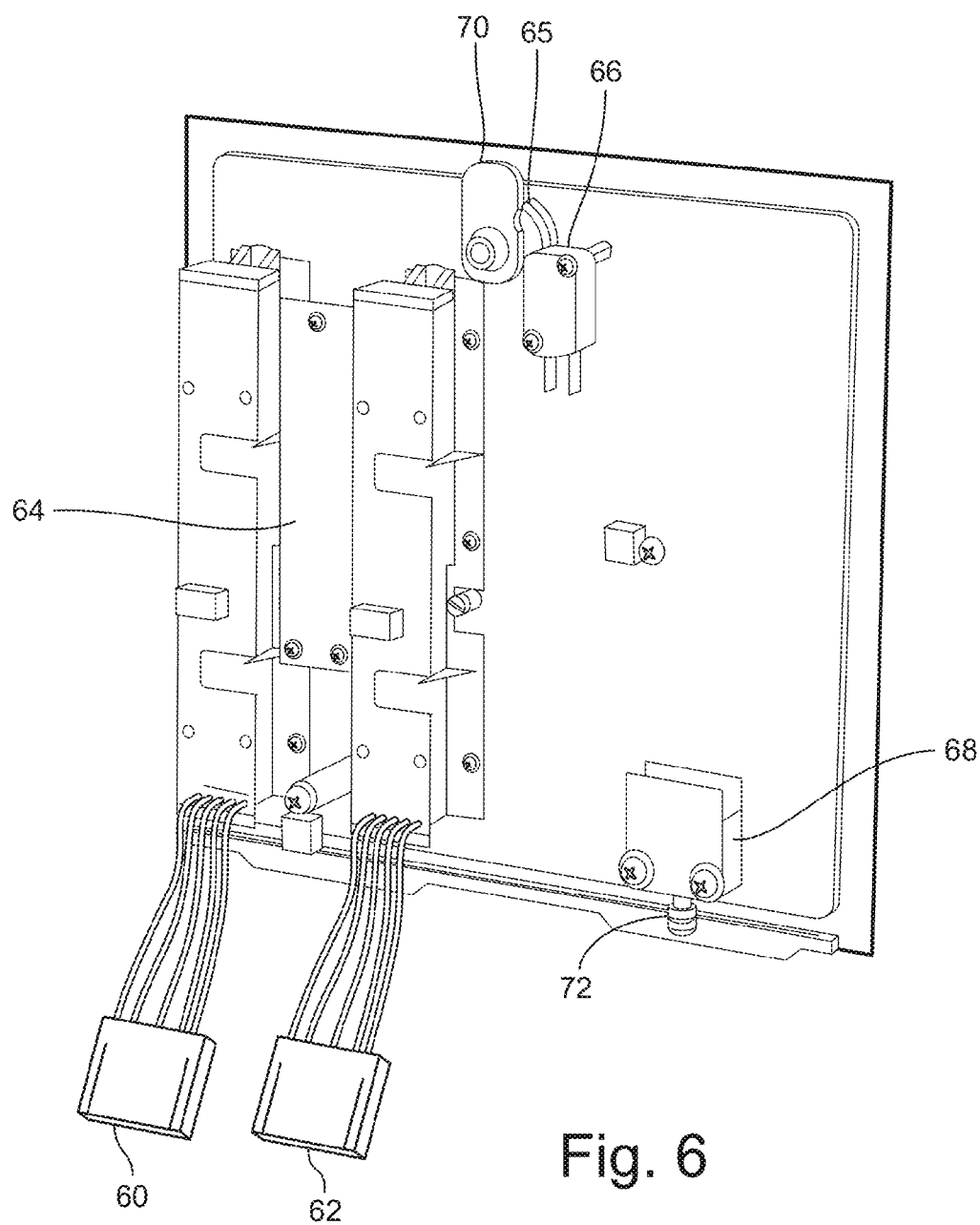
FIG. 6 shows a rear perspective view of an example of the card reader assembly for embodiments of the invention mounted on the back of the front panel.

FIG. 6 shows a rear perspective view of an example of the card reader assembly for embodiments of the invention mounted on the back side of the front panel 30. Referring to FIG. 6, the card reader assembly for embodiments of the invention may utilize, for example, circuit board connectors 60, 62 that are used in existing branch wiring, such that the card reader assembly cables may connect to existing branch cabling.

Referring further to FIG. 6, a LED/buzzer circuit board 64 may provide an audible feedback to a cardholder once the BIN or IIN segment 28 of the magnetic stripe 22 on the cardholder's card 12 has been read successfully. The LED/buzzer circuit board 64 may also drive one or more LEDs, such as LEDs 64, 66, 68 on the front side of the front panel 30, as shown in FIG. 2, to notify the cardholder when the ATM lobby or vestibule door is unlocked, when the card swipe assembly is in a ready mode so the cardholder may begin a swipe operation, or when a card error, such as an incomplete swipe occurs or an illegible BIN or IIN range is encountered.

In embodiments of the invention, F2F or frequency twice frequency data (where a zero is encoded on the magnetic stripe as a single flux transaction, and one is encoded as two flux transactions) read from the magnetic stripe 22 by the read head 52 is sent to a controller that in turn sends the data up-line over a TCP/IP (Transmission Control Protocol/Internet Protocol) link to an ACCR host (not shown) which stores a listing of all valid BIN or IIN ranges. If the BIN or IIN read by the read head 52 and received by the ACCR host is a valid BIN or IIN, the ACCR host sends a message to an ACCR mechanism to unlock the branch, vestibule or lobby door. The valid BIN or IIN list is regularly updated and identifies a valid bankcard and may include BINs or IINs for all banks worldwide. However. the valid BIN or IIN list may not include non-bankcards, such as a merchant's store card that is usable only in a particular store of the merchant.

Referring further to FIG. 6, the card reader assembly for embodiments of the invention may also include, for example, tamper switches, such as first and second tamper switches 66, 68, as a means of discovering when a criminal accesses the interior of the card swipe assembly. A lever 65 of the first tamper switch 66 may ride on the hinged or pivoted part 70 of the front panel lock referred to as the pawl of the lock. Rotation of the pawl 70 of the lock may trigger a micro-switch of the first tamper switch 66 which in turn sends an error code upline to a host (not shown) which alerts personnel of the financial institution that the front panel 30 of the card reader assembly has been opened and may require investigation to determine whether or not the opening was authorized.

It is to be noted that the such rotation of the lock pawl 70 which triggers the micro-switch of the first tamper switch 66 may result not only by rotation of the lock pawl 70 with a key but also may result when the face plate is removed by a criminal using a pry-bar or similar device. In either case, pressure on the actuating lever of the micro-switch of the tamper switch 66 is relieved which triggers the micro-switch. The second tamper switch 68 may be deployed at another location on the back side of the front plate 30. In such location, a micro-switch of the second tamper switch 68 may be triggered when movement or removal of the front plate 30 causes pressure on an actuating plunger 72 of the micro-switch to be relieved.

What is claimed is:

1. A magnetic stripe card reader assembly, comprising:
   a panel having portions defining a card entry opening of a card entry path for receiving a magnetic stripe card with the magnetic stripe disposed perpendicular to the card entry path;
   a card swipe path in communication with the card entry path for swiping the card with the magnetic stripe disposed parallel to the card swipe path;
   a magnetic stripe read head disposed proximate the card swipe path for reading only a pre-determined segment of data encoded on the magnetic stripe; and
   the panel having portions defining a card withdrawal opening of a card withdrawal path in communication with the card swipe path and partly overlapping the card entry opening for withdrawal of the card with the magnetic stripe disposed perpendicular to the card withdrawal path.

2. The card reader assembly of claim 1, wherein the card entry path further comprises a card entry guide for guiding a first edge of the card along the card entry path.

3. The card reader assembly of claim 2, wherein the card entry path further comprises a back stop defining a terminus of the card entry path.

4. The card reader assembly of claim 3, wherein the card swipe path further comprises the back stop defining a guide for guiding a second edge of the card along the card swipe path.

5. The card reader assembly of claim 4, wherein the card swipe path further comprises a bottom stop defining a terminus of the card swipe path.

6. The card reader assembly of claim 5, wherein the card withdrawal path further comprises the bottom stop defining a guide for guiding a third edge of the card along the card withdrawal path.

7. The card reader assembly of claim 1, wherein the magnetic stripe read head is spaced from a terminus of the card swipe path by a distance that is less than a length of the magnetic stripe.

8. The card reader assembly of claim 7, wherein the magnetic stripe read head is spaced from the terminus of the card swipe path by a distance that at least as great as a length of the pre-determined segment of the magnetic stripe.

9. The card reader assembly of claim 1, wherein the magnetic stripe read head is disposed proximate the card swipe path for reading only the pre-determined segment of data encoded on the magnetic stripe on which is encoded only data for unlocking an electric lock.

10. The card reader assembly of claim 9, wherein the magnetic stripe read head is disposed proximate the card swipe path for reading only the pre-determined segment of data encoded on the magnetic stripe on which is encoded only issuer identification data for unlocking the electric lock.

11. The card reader assembly of claim 9, wherein the magnetic stripe read head is disposed proximate the card swipe path for reading only the pre-determined segment of data encoded on the magnetic stripe on which is encoded only bank identification data for unlocking the electric lock.

12. The card reader assembly of claim 1, wherein the magnetic stripe read head is disposed proximate the card swipe path for reading only the pre-determined segment of data encoded on the magnetic stripe on which is encoded only data for unlocking an electric lock and without reading a segment of account data encoded on the magnetic stripe.

13. The card reader assembly of claim 1, wherein the magnetic stripe read head is disposed proximate the card swipe path for reading only the pre-determined segment of data encoded on the magnetic stripe on which is encoded only issuer identification data for unlocking the electric lock and without reading a segment of account data encoded on the magnetic stripe.

14. The card reader assembly of claim 1, wherein the magnetic stripe read head is disposed proximate the card swipe path for reading only the pre-determined segment of data encoded on the magnetic stripe on which is encoded only bank identification data for unlocking the electric lock and without reading a segment of account data encoded on the magnetic stripe.

15. A method for reading a magnetic stripe card comprising:
- providing a panel having portions defining a card entry opening into a card entry path for receiving a magnetic stripe card with the magnetic stripe disposed perpendicular to the card entry path;
- providing a card swipe path in communication with the card entry opening for swiping the card with the magnetic stripe disposed parallel to the card swipe path;
- locating a magnetic stripe read head proximate the card swipe path for reading only a pre-determined segment of data encoded on the magnetic stripe; and
- further providing the panel with portions defining a card withdrawal opening of a card withdrawal path in communication with the card swipe path and partly overlapping the card entry opening for withdrawal of the card with the magnetic stripe disposed perpendicular to the card withdrawal path.

* * * * *